(12) United States Patent
Picca

(10) Patent No.: US 6,322,253 B1
(45) Date of Patent: Nov. 27, 2001

(54) MOTOR VEHICLE WHEEL HUB BEARING AND A METHOD FOR MOUNTING THE BEARING ONTO A MOTOR VEHICLE SUSPENSION

(75) Inventor: Mauro Picca, Perosa Argentina (IT)

(73) Assignee: SKF Industrie S.p.A., Torin (IT)

( * ) Notice: Subject to any disclaimer, the term of this patent is extended or adjusted under 35 U.S.C. 154(b) by 0 days.

(21) Appl. No.: 09/513,271

(22) Filed: Feb. 24, 2000

(30) Foreign Application Priority Data

Feb. 24, 1999 (IT) .................................................. TO99A0142

(51) Int. Cl.[7] ...................................................... F16C 19/08
(52) U.S. Cl. ............................ 384/513; 384/537; 384/544
(58) Field of Search .................................. 384/513, 537, 384/544, 589, 584

(56) References Cited

U.S. PATENT DOCUMENTS

| | | |
|---|---|---|
| 1,665,437 | 4/1928 | Booth . |
| 1,816,643 | 7/1931 | Forsyth . |
| 2,022,041 | 11/1935 | Kliesrath . |
| 2,153,280 | 4/1939 | Shelor . |
| 2,896,519 | 7/1959 | Martin . |
| 2,905,279 | 9/1959 | Moyer . |
| 3,403,758 | 10/1968 | Stout . |
| 3,583,511 | 6/1971 | Asberg ............................ 188/18 A X |
| 3,767,221 | 10/1973 | Asberg ............................... 188/18 A |
| 3,884,331 | 5/1975 | Asberg ............................... 188/18 A |
| 4,067,621 | 1/1978 | Reppert . |
| 4,270,805 | 6/1981 | Spisak . |
| 4,383,588 | 5/1983 | Krude . |
| 4,398,775 | 8/1983 | Hofmann et al. . |
| 4,544,209 | 10/1985 | Braungart . |
| 4,550,809 | 11/1985 | Kawaguchi . |
| 4,596,312 | 6/1986 | Kawaguchi . |
| 4,621,700 | 11/1986 | Merkelbach . |
| 4,708,497 | 11/1987 | Lederman . |
| 4,792,020 | 12/1988 | Okumura et al. .................. 188/18 A |
| 4,880,281 | 11/1989 | Merkelbach ......................... 301/126 |
| 4,913,266 | 4/1990 | Russell et al. . |
| 5,051,003 | 9/1991 | Sasyama . |
| 5,051,004 | 9/1991 | Takeuchi et al. . |
| 5,193,917 | 3/1993 | Adler et al. . |
| 5,215,387 | 6/1993 | Bertetti et al. . |
| 5,366,279 | 11/1994 | Polka . |
| 5,590,967 | 1/1997 | Kapaan ............................ 384/544 Z |
| 5,957,590 | 9/1999 | Picca et al. . |
| 5,975,647 | 11/1999 | Pons et al. . |
| 5,988,324 | 11/1999 | Bertetti et al. . |
| B1 4,282,952 | 10/1988 | Bartley . |

FOREIGN PATENT DOCUMENTS

| | | |
|---|---|---|
| 1 189 877 | 3/1965 | (DE) . |
| 70 34 015 | 9/1970 | (DE) . |
| 2635608 | 2/1978 | (DE) . |
| 29 19 411 | 11/1980 | (DE) . |
| 39 00 356 | 7/1990 | (DE) . |
| 43 38 261 A | 5/1994 | (DE) . |
| 0 156 552 | 10/1985 | (EP) . |
| 371 836 | 6/1990 | (EP) . |
| 680 836 | 11/1995 | (EP) . |
| 703130 | 3/1996 | (EP) . |
| 0794072A2 | 9/1997 | (EP) . |
| 2 723 886 | 3/1996 | (FR) . |
| 2 207 470 A | 2/1989 | (GB) . |
| TO94A000596 | 7/1994 | (IT) . |
| TO96A000387 | 5/1996 | (IT) . |

*Primary Examiner*—Lenard A. Footland
(74) *Attorney, Agent, or Firm*—Merchant & Gould P.C.

(57) ABSTRACT

A motor vehicle wheel hub bearing comprises an outer race to be mounted in a cylindrical seat formed in a suspension strut and fixed in the seat by cold rolling. The outer race has an outer cylindrical surface to be fitted into the seat. The cylindrical surface extends over the whole axial dimension of the outer race and has a greater axial dimension than that of the strut. The two axially opposite ends of the cylindrical surface comprise respective axial tubular projections adapted to be deformed radially outwardly by cold forming towards respective opposite lateral surfaces of the strut so as to fix the bearing to the strut.

5 Claims, 3 Drawing Sheets

MOTOR VEHICLE WHEEL HUB BEARING AND A METHOD FOR MOUNTING THE BEARING ONTO A MOTOR VEHICLE SUSPENSION

The present invention relates to a motor vehicle wheel hub bearing, of the type identified in the preamble of claim 1. The invention further relates to a method for mounting the bearing on the suspension strut of a motor vehicle.

A bearing of the said type, known from European Patent Application EP-A-0 794 072 is illustrated in FIG. 1. With reference to FIG. 1, a bearing generally indicated 1 comprises a radially outer race 2 which has two rolling raceways for respective sets of rolling balls 3. The balls can rotate on radially inner raceways 4 and 5 which are mounted on a flanged hub 6 fixed for rotation in a known way to an axle 7.

The outer race 2 includes an annular main portion 6 which extends to only one axially inner side (that is to say facing towards the interior of the vehicle) forming an axial tubular projection 10 which defines, with the main annular portion 9, an axial abutment shoulder 11 able to abut against the outer lateral surface 12 of the strut 13.

A cylindrical seat 14 is formed in the strut 13, into which the outer cylindrical surface 15 of the tubular projection 10 is force fitted. This tubular projection has an axial dimension greater than the axial thickness of the strut 13, in such a way that the axially inner rim of the tubular projection 10 can be folded and radially outwardly deformed against the axially inner lateral surface 16 of the strut 13 by means of a cold-rolling plastic deformation operation, to obtain a rolled edge 17 which thus axially fixes the bearing onto the suspension strut.

This arrangement, which is advantageous as it makes it possible to fix the bearing onto the suspension without causing deformations in the region of the raceways of the outer race of the bearing, does, however, have a disadvantage due to the fact that it requires very accurate mechanical finishing in particular for the formation of the shoulder 11. The outer race of the bearing is moreover made heavier by that portion of the material which forms the said shoulder.

An object of the invention is to provide a bearing of the above-identified type, having an outer race of less weight and which involves, for its finishing, a simpler and more rugged turning operation, which is therefore economically advantageous.

Another object of the invention is to provide a bearing in which the material from which it is made is utilized in an optimal manner.

A yet further object is to center a bearing in an improved and more "flexible" manner on the motor vehicle suspension.

These objects are achieved according to the present invention by a bearing for a motor vehicle wheel hub, comprising an outer race adapt to be mounted in a cylindrical seat formed in a suspension strut and fixed in the said seat by cold forming, said outer race having:
  a main annular portion forming raceways for rolling elements;
  an outer cylindrical surface to be fitted in said seat; wherein said cylindrical surface extends over the whole axial dimension of the outer race and has an axial dimension greater than that of the strut, and wherein the two opposite axial ends of said cylindrical surface comprise respective axial tubular projections extending from said main portion; said tubular projections being dimensioned so that their ends can be plastically deformed by cold forming radially outwardly towards respective opposite lateral surfaces of the strut so as to fix the bearing to the strut.

According to another aspect of the invention, these objects are achieved by a method for mounting a motor vehicle wheel hub bearing to a suspension strut, the method comprising the following steps:
  (a) providing a suspension strut having an axial cylindrical seat extending between two opposite lateral surfaces;
  (b) providing a bearing comprising an outer race having:
    a main annular portion forming raceways for rolling elements; and
    an outer cylindrical surface adapted to be inserted into said seat of the strut, said cylindrical surface extending over the whole axial dimension of the outer race and having a greater axial dimension than the axial thickness of the strut; the two opposite axial ends of the cylindrical surface comprising respective axial tubular projections extending from said main portion;
  (c) inserting the outer ring into said seat of the strut in such a way as to leave opposite end portions of the tubular projections projecting beyond said opposite lateral surfaces by predetermined distances;
  (d) cold forming said end portions in radially outwardly directions towards the said respective opposite lateral surfaces o f the strut, thereby forming deformed edges which fix the bearing to the strut.

Further important characteristics of the invention are specified in the dependent claims.

The characteristics and advantages of the present invention will become apparent from the detailed description of various embodiments thereof, given with reference to the attached drawings, given by way of non-limiting example, in which.

Figure 1:
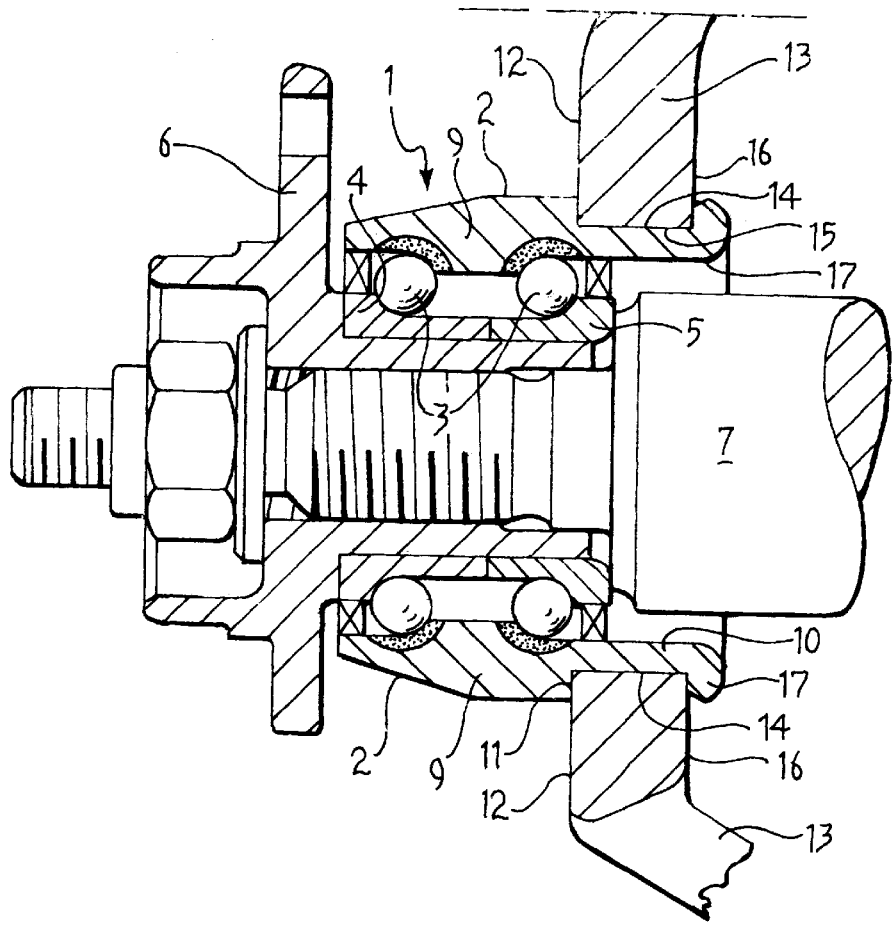
FIG. 1 is a vertical axial section of a prior art wheel hub bearing mounted on a motor vehicle strut.
Figure 3:
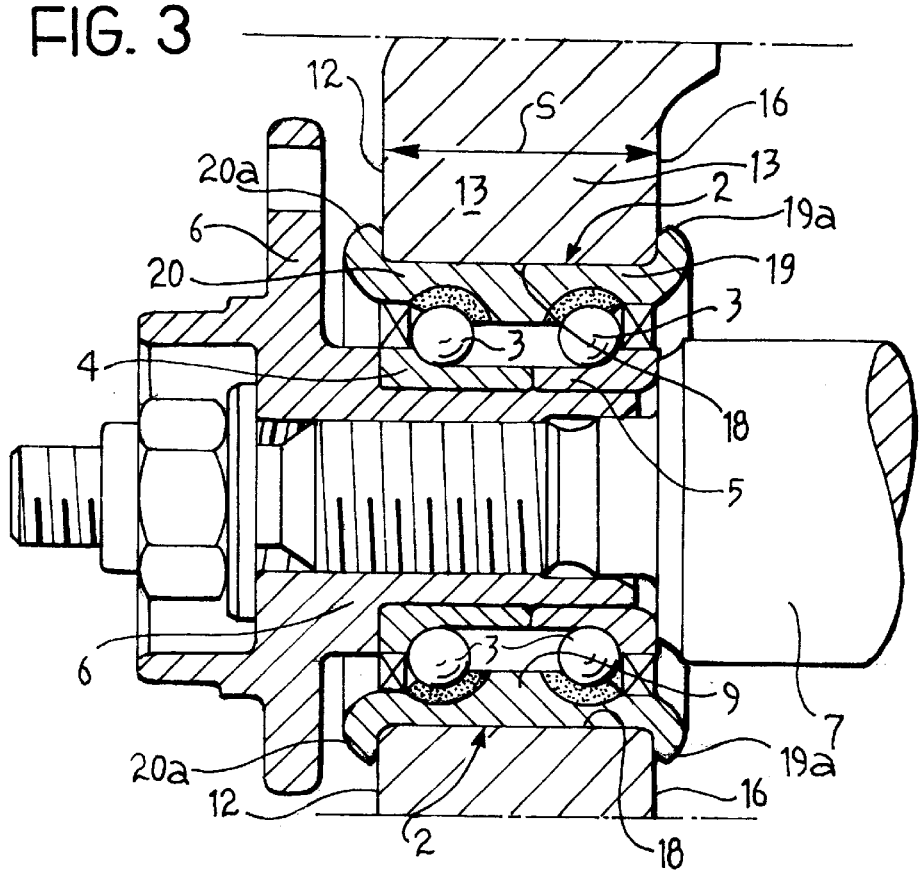
FIG. 3 is an axial sectional view of a motor vehicle wheel hub having a bearing according to the present invention fixed to the suspension strut of a motor vehicle.
Figure 4:
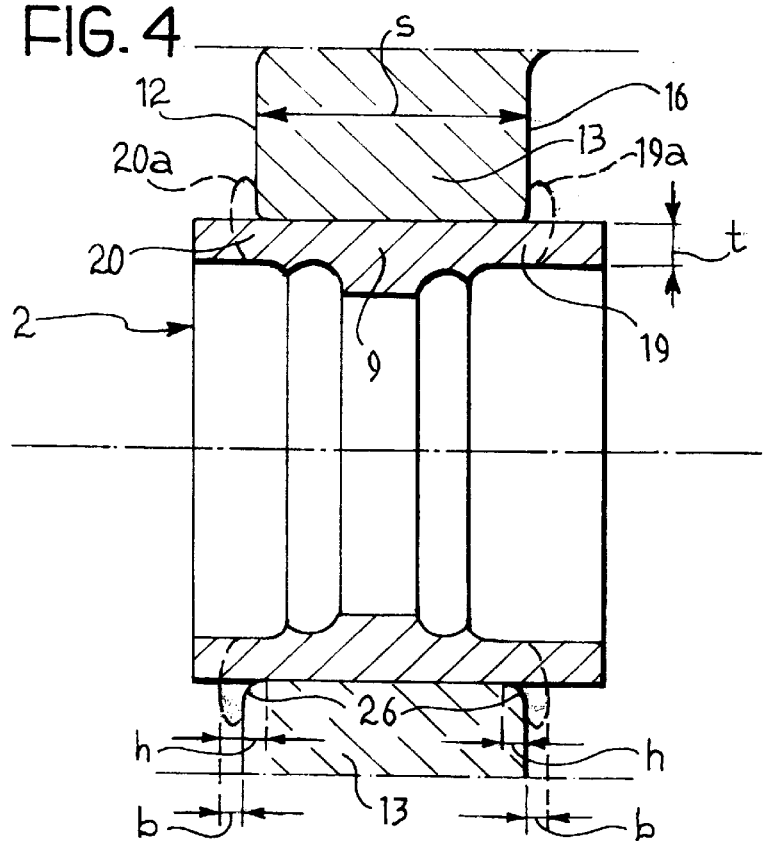
FIG. 4 is a view in axial section of the outer race of the bearing of FIG. 3.

Referring to FIGS. 3 and 4, and utilizing the same reference numerals already adopted for FIG. 1, a bearing according to the present invention comprises a radially outer race 2, described in more detail below, a pair of radially inner races or half-races 4 to 5, and two sets of rolling elements 3, in this example balls, radially interposed between the outer race 2 and the inner half-races 4 and 5.

With reference now in particular to FIG. 4, the outer race 2 comprises a central main annular portion 9 in which the raceways are formed for the rolling elements 3. The outer race 2 has an outer cylindrical surface 18 adapted to be inserted in a cylindrical seat 14 formed in the strut 13 of a suspension. Preferably, the seat 14 and the cylindrical surface 18 are so dimensioned as to provide some radial interference requiring a forced fitting of the bearing in the strut, to obtain a better locking of the bearing.

The outer surface 18 extends over the whole of the axial dimension of the outer race 2 and has a greater axial dimension than that of the strut 13.

The two axially opposite ends of the cylindrical surface 18 comprise respective axial tubular opposite end projections 19 and 20 which extend from the central main portion 9; the tubular projections 19 and 20 are shaped and outwardly dimensioned to be plastically deformed, cold, preferably by being rolled radially outwardly towards the inner and outer lateral surfaces 16 and 12 of the strut 13 so as to assume the configuration illustrated in FIG. 3, and in broken outline in FIG. 4, as indicated by the reference numerals 19a and 20a.

Preferably, the radially inner races 4 and 5 have an overall axial dimension not greater than the axial thickness s of the strut 13.

Figure 5:
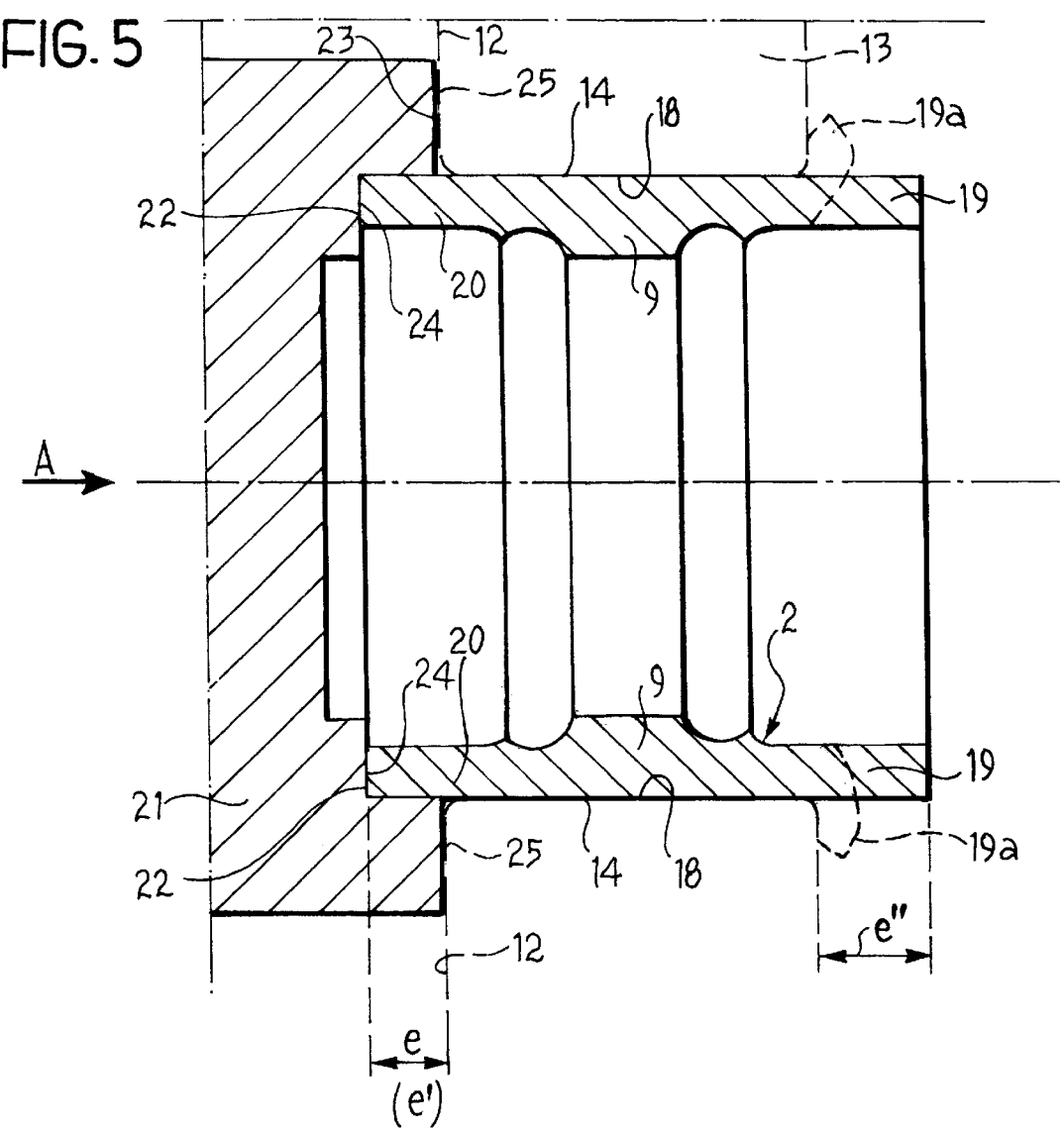
FIG. 5 illustrates a mounting phase of the bearing onto the suspension.

The sequence of operations for mounting the bearing onto the strut provides that the complete bearing of outer race, inner race and rolling elements is inserted into the seat 14 of the strut. In the preferred embodiment, in which there is provided some radial interference between the surface 18 of the outer race 2 and the seat 14 of the strut, the outer race 2 is inserted forcibly. The insertion could for example by effected by means of a tool 21 schematically illustrated in FIG. 5 which has a first axial abutment surface 22 and a second axial abutment surface 23, axially spaced from one another by a predetermined distance e.

The first abutment surface 22 presses the outer, undeformed face 24 of the axially outer extension 20 in the axial direction indicated by the arrow A until the second axial abutment surface 23 engages against a reference surface 25 fixed to the strut, in this case represented by a zone 12 of the outer surface of the strut close to the cylindrical seat 14.

The distance e is predetermined in such a way that in the abutment configuration the ends of the tubular projections 19 and 20 project, in the undeformed condition before rolling, by respective distances e' and e" beyond the lateral surfaces 16 and 12 of the strut. The distances e' and e" can be the same or slightly different depending on requirements, thus making it possible to fix the bearing to the strut in a plurality of different axial positions. In each case the distances by which the said undeformed ends project beyond the lateral surfaces of the strut will be such as to allow the formation of corresponding rolled edges 19a and 20a effective in axially fixing of the bearing onto the strut.

The rolling operations can be equally well performed simultaneously on both projections or, alternatively, in two successive steps, resisting axial movement of the outer race 2 by means of the same tool 21 utilized to determine the desired axial position of the outer race with respect to the strut.

In the preferred embodiment of the method according to the invention, the deformed edges 19a and 20a each have an axial thickness b less than or equal to the radial thickness t of the tubular projections 19 and 20 in their undeformed condition, as indicated in FIG. 4.

For the purposes of improving the fixing of the bearing to the strut it is also advantageous to form a bend or a circumferentially curved connection 26 on the strut, in the connection region between the opposite lateral surfaces 16, 12 and the cylindrical seat 14, each preferably having an axial extent h not greater than 3 mm.

Figure 6:
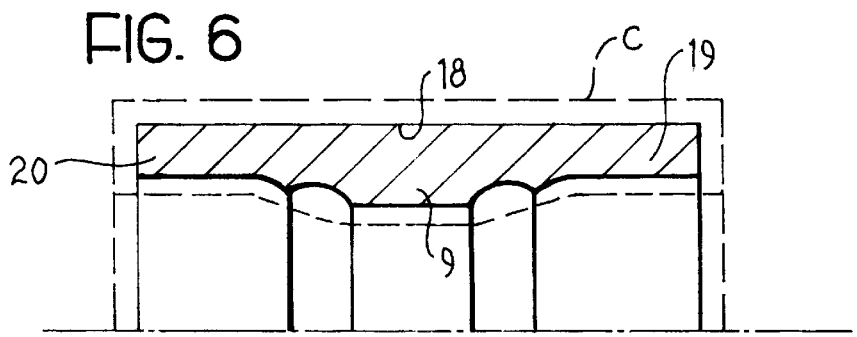
FIG. 6 is a partial view in axial section of a forged blank from which an outer race for a bearing according to the invention is formed.

As may be appreciated, the outer race of the bearing according to the present invention is obtained from a forged blank of very much simpler form, as schematically indicated by the broken outline C in FIG. 6. It will be noted that on the radially outer surface of the outer race it is not necessary to form with precision the conventional shoulder 11 of FIG. 2.

Figure 2:
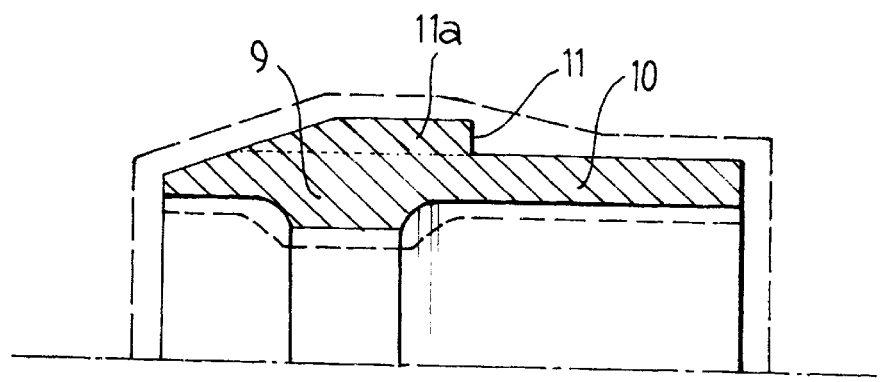
FIG. 2 is a partial axial section of a detail of the bearing of FIG. 1.

Moreover, with particular reference to FIG. 2, the material conventionally used to form the reinforcement region 11a of the shoulder 11 is saved: as a consequence, the working operations will be expedited with respect to the prior art discussed in the introduction, in that the turning operation to obtain a cylindrical surface is simpler and faster.

In addition, the quantity of excess metal to remove from the partly worked workpiece will generally be less as will be apparent from comparison of the broken outlines in FIGS. 2 and 6.

Finally, the outer races obtained according to the invention are lighter and have an axially symmetrical structure so that they can be mounted indifferently with either of their faces being the frontal face thus simplifying mounting.

Naturally, the principle of the invention remaining the same, its details can be varied with respect to what has been described in the present example. In particular, it would be possible to form a plurality of radial recesses (or projections) in one or both lateral surfaces 12 and 16 of the strut, which would be interpenetrated by the folded material of one or both edges 19a or 20a so as to ensure fixing against possible rotation of the outer race with respect to the strut.

What is claimed is:

1. A bearing for a motor vehicle wheel hub, comprising an outer race adapt to be mounted in a cylindrical seat formed in a suspension strut and fixed in the said seat by cold forming, said outer race having:

a main annular portion forming raceways for rolling elements;

an outer cylindrical surface to be fitted in said seat; wherein said cylindrical surface extends over the whole axial dimension of the outer race and has an axial dimension greater than that of the strut, and wherein the two opposite axial ends of said cylindrical surface comprise respective axial tubular projections extending from said main portion; said tubular projections being dimensioned so that their ends can be plastically deformed by cold forming radially outwardly towards respective opposite lateral surfaces of the strut so as to fix the bearing to the strut.

2. The bearing of claim 1, wherein said main annular portion is substantially central.

3. The bearing of claim 2, wherein said outer race has an axially symmetrical shape.

4. The bearing of claim 1, wherein said tubular projections are dimensioned in such a way that in the undeformed condition before being cold formed their opposite ends extend beyond said lateral surfaces by respective distances so as to allow the bearing to be fixed to the strut in a plurality of axially different positions.

5. The bearing of claim 1, comprising one or more radially inner races having an overall axial dimension not greater than the axial thickness of the strut.

* * * * *